United States Patent [19]
Rekonen et al.

[11] Patent Number: 5,814,710
[45] Date of Patent: Sep. 29, 1998

[54] PROCESS FOR SELECTIVE HYDROGENATION OF UNSATURATED POLYMERS

[75] Inventors: Petri Rekonen; Nina Kopola; Salme Koskimies; Ove Andell; Marita Oksman, all of Helsinki, Finland

[73] Assignee: Neste Oy, Provoo, Finland

[21] Appl. No.: 704,656

[22] PCT Filed: Mar. 3, 1995

[86] PCT No.: PCT/FI95/00120

§ 371 Date: Dec. 4, 1996

§ 102(e) Date: Dec. 4, 1996

[87] PCT Pub. No.: WO95/25130

PCT Pub. Date: Sep. 21, 1995

[30] Foreign Application Priority Data

Mar. 14, 1994 [FI] Finland .................................. 941189

[51] Int. Cl.⁶ ..................................... C08F 8/04
[52] U.S. Cl. ................... 525/332; 525/332.9; 525/339
[58] Field of Search ..................... 525/338, 339

[56] References Cited

U.S. PATENT DOCUMENTS

| | | |
|---|---|---|
| 4,673,714 | 6/1987 | Kishimoto et al. . |
| 4,876,314 | 10/1989 | Hoxmeier et al. . |
| 5,039,755 | 8/1991 | Chamberlain et al. . |
| 5,057,582 | 10/1991 | Hoxmeier et al. . |
| 5,204,419 | 4/1993 | Tsutsui et al. ............... 526/153 |
| 5,242,986 | 9/1993 | Gibler et al. . |

FOREIGN PATENT DOCUMENTS

| | | |
|---|---|---|
| 0322731 | 12/1988 | European Pat. Off. . |
| 0368419 | 11/1989 | European Pat. Off. . |
| 0396780 | 11/1989 | European Pat. Off. . |
| 0401897 | 5/1990 | European Pat. Off. . |
| 0-434469 | 12/1990 | European Pat. Off. . |
| 0471415 | 8/1991 | European Pat. Off. . |
| 0532099 | 9/1992 | European Pat. Off. . |
| 0540122 | 10/1992 | European Pat. Off. . |
| 62-209103 | 9/1987 | Japan . |

OTHER PUBLICATIONS

Chemical Abstracts vol. 114, 1991, p. 94,, and 39–Elastomers vol. 114, 1991, 166121, p. 95.

*Primary Examiner*—Bernard Lipman
*Attorney, Agent, or Firm*—Birch, Stewart, Kolasch & Birch, LLP

[57] ABSTRACT

The invention relates to the selective hydrogenation of unsaturated polymers, in particular elastomeric polymers which contain aromatic rings and carbon-carbon double rings, for example polymers prepared from styrene and butadiene. In this case, the polymer molecule contains internal and terminal-group double bonds, as well as unsaturated bonds in aromatic rings. According to the invention, only the unsaturated terminal and internal bonds are hydrogenated, whereby the thermal and weather resistance properties of the product are improved. Conventionally, hydrogenation has been performed by means of nickel or cobalt catalysts, but now it has been observed that a metallocene/alumoxane catalyst complex not only catalyzes the polymerization reaction of various olefinic compounds but also catalyzes the selective hydrogenation of unsaturated polymers, preferably styrene-butadiene-styrene block polymers.

14 Claims, No Drawings

PROCESS FOR SELECTIVE HYDROGENATION OF UNSATURATED POLYMERS

The present invention relates to a method for the selective hydrogenation of unsaturated polymers which contain both carbon-carbon double bonds and aromatic rings, and to a catalyst complex for performing such hydrogenation.

Double bonds of unsaturated polymers are useful, for example, in the elastomer vulcanization process, during which inter-molecular chemical bridging takes place by means of the said unsaturated double bonds and the properties of the elastomers are improved, for example they become mechanically and chemically more durable, and technically usable rubber-like products are obtained. On the other hand, unsaturated bonds, in particular olefinic carbon-carbon double bonds, which remain or are intentionally left in the final product because of processibility or final product properties, also cause disadvantages in the polymer product. These disadvantageous properties, such as poor resistance to weather, heat or ozone, can be improved by selective hydrogenation of the olefinic double bonds of the polymer.

Polymers suitable for use in this method are preferably polymers of conjugated diolefins, in particular copolymers thereof, which have been prepared from the said diolefins and vinyl aromatic hydrocarbons. These may be random or block polymers, or combinations thereof, in which the conformation of the polymer may be linear, star-like or radial. Polymers especially suitable for the invention are butadiene-styrene block polymers. The hydrogenation products of styrene-butadiene-styrene block polymers (so-called SBS polymers) are economically considerably more valuable than the initial material, since the hydrogenated product is thermoplastic and it can be reused, which cannot be done with SBS rubber which has been bridged, i.e. vulcanized, with sulfur or peroxides.

The catalyst must be a so-called homogenous compound and not bound to a solid carrier, in order for it to have access to all parts of the polymer molecule and to be able to hydrogenate any olefinic carbon-carbon double bonds therein.

Conventionally the catalysts used in many hydrogenation reactions of diene polymers have been metals of group VIII of the Periodic Table of Elements, or compounds thereof. These include compounds of nickel, cobalt, platinum and palladium. Their use has been limited by the high price of the compounds and/or the catalysis of polymer decomposition reactions caused by their residues, so that it has been necessary to remove the catalyst residues from the hydrogenated polymer.

Often a cocatalyst is used alongside the above-mentioned compounds to promote or in some other way improve the action of the catalyst proper. Suitable compounds include the alkyl aluminum compounds disclosed in U.S. Pat. Nos. 3,696,088 and 4,107,236.

It has been observed that metallocene compounds also serve as compounds which hydrogenate polymers. Their action is quite efficient, and thus it has not always been necessary to remove their residues from the final product, and the quality of the product has not suffered. In this case, also, a cocatalyst, such as alkyl aluminum compounds, alkyl lithium compounds and Grignard reagents, are needed for promoting the action of the catalyst compound. The cocatalyst used alongside a titanocene compound, which was bis-cyclopentadienyl titanium dihalide, was, according to patent application EP 532 099, alkyl benzoate and, according to EP 471 415, alkali metal compounds, in particular alkyl-Li compounds. According to patent application EP 434 469, an SBS polymer is hydrogenated by means of zirconocene and a metal complex cocatalyst. The preparation of the metal complex, which contains Li and Al compounds, is, however, carried out by a very cumbersome and time-consuming in situ procedure.

The method according to the invention is characterized in that therein the catalyst used in the hydrogenation reaction is a new metallocene/cocatalyst complex which is formed from a complex of a metallocene and alumoxane. The metallocene component precursor used is preferably zirconocene compounds of the form $(Ar)_2ZrR_2$, wherein Ar is a cyclopentadienyl or indenyl group, which may also be substituted (usually with an alkyl group), and R is a halogen, alkyl or aryl group, preferably chlorine, a lower alkyl group, such as methyl or benzyl group. The cocatalyst used is an alumoxane compound which contains one or more groupings —Al(R)—O—, which has a lower alkyl group, preferably methyl group. Methylalumoxane (MAO) is often available as a 10–30% toluene solution, in which case the aluminum content in the solution is approx. 5–15%.

This catalyst complex is homogenous, so that even those carbon-carbon double bonds which are in the middle of the polymer molecule, often in a sterically difficult position, can become hydrogenated, not only the double bonds which are in terminal positions. The catalyst complex is also selective, and the unsaturated bonds of the aromatic ring are not hydrogenated.

The hydrogenation of unsaturated polymers by means of the catalyst complex according to the invention is rapid and easy, as compared with state-of-the-art methods. The hydrogenation reaction is performed as follows: first the polymer is dissolved in a suitable solvent, the operation being in an inert atmosphere throughout the hydrogenation. Suitable solvents include aromatic hydrocarbons, e.g. benzene, toluene and xylene, or aliphatic hydrocarbons, e.g. pentane, hexane, and heptane. Next, hydrogen gas is added to the polymer solution, and the hydrogen reduces the olefinic double bonds of the polymer being treated, by linking hydrogen to them. The hydrogenation temperature may be 30°–300° C., preferably 70°–120° C. If the temperature is below 30° C., the activity of the catalyst is weak and the hydrogenation reaction may occur too slowly. If the temperature is above 300° C., secondary reactions and breaking down of the polymer may occur, and even the aromatic ring may begin to hydrogenate. The hydrogen pressure during the hydrogenation may be within the range 5–50 bar. If the pressure is lower, the hydrogenation reaction will be slow, and little or no hydrogenation will occur. A pressure below the said range may lead to secondary reactions and breaking down of the polymer. Preferably the pressure is 15–25 bar. The concentration of the catalyst complex in the reaction solution of the hydrogenation reaction is 0.1–5% by weight, preferably 0.2–2% by weight. When the catalyst amount is maintained within this range, specifically olefinic double bonds can be hydrogenated selectively, without touching the aromatic bonds at all.

Embodiment examples of the hydrogenation of styrene-butadiene-styrene block polymers (SBS) are described below. Toluene was used in them as the solvent for the polymer and as the medium for the reaction. Most of the double bonds had reacted at approx. 15 minutes from the beginning of the reaction, but in order to ensure the progress of the reaction to completion, the reaction was continued for 40–150 min.

EXAMPLES 1–4

5.0 g of an SBS polymer (a so-called star-form butadiene-styrene block polymer having a molecular weight of approx.

135 000 g/mol) was weighed into a reactor, and 100 ml of toluene was added. A catalyst complex was prepared by mixing in an inert atmosphere the amount shown in Table 1 of a catalyst precursor, which was the zirconocene compound indicated in Table 1, and a cocatalyst, which was always methylalumoxane. In the catalyst complex the Al/Zr ratio was approx. 118 (precise value is shown in Table 1). The temperature of the reaction mixture was raised to 90° C., and the reactor was hydrogenated three times, and then the hydrogen pressure was raised to 20 bar. The hydrogenation was continued for 40 min. The product was washed first with an 0.1 N HCl solution, and then several times with water, was isolated by water vapor distillation, and was dried. The degree of hydrogenation of the product was determined by NMR spectroscopy; the results are shown in Table 1. No degree of hydrogenation of the aromatic rings was observable on the basis of the NMR spectra. The selectivity of the hydrogenation was also ascertained by hydrogenating a styrene monomer and by analyzing the sample by means of GC-MS. It was observed that the aromatic ring did not become hydrogenated under the conditions used.

TABLE 1

| Example | Zirconocene | Catalyst amount, mmol/ 100 g of polymer | Al/Zr ratio in catalyst complex | Degree of hydrogenation % |
|---|---|---|---|---|
| 1 | $Cp_2ZrCl_2$ | 3,08 | 118 | 80 |
| 2 | $(Me_2Cp)_2ZrCl_2$ | 2,81 | 115 | 73 |
| 3 | $(n\text{-}BuCp)_2ZrCl_2$ | 2,22 | 118 | 74 |
| 4 | $(Ind)_2ZrCl_2$ | 2,29 | 119 | 56 |

$Cp_2ZrCl_2$ = bis-cyclopentadienyl-Zr-dichloride
$(Me_2Cp)_2ZrCl_2$ = bis-dimethylcyclopentadienyl-Zr-dichloride
$(n\text{-}BuCp)_2ZrCl_2$ = bis-di-n-butylcyclopentadienyl-Zr-dichloride
$(Ind)_2ZrCl_2$ = bis-indenyl-Zr-dichloride

EXAMPLE 5

By the method described in Example 1, a hydrogenation reaction was performed on a similar polymer. The catalyst complex was formed of bis-indenyl-Zr-dibenzyl (3.14 mmol/100 g of polymer) and methylalumoxane (3.60 g). The Al/Zr ratio in the complex was thus 117. The polymer hydrogenation degree achieved was 80%.

EXAMPLES 6–10

In these examples, the effect of the cocatalyst amount was investigated by using the hydrogenation procedure and SBS polymer described in Example 1. The catalyst complex was formed of bis-cyclopentadienyl-Zr-dichloride and methylalumoxane. The hydrogenation reaction was continued for approx. 150 min. The amounts of the zirconocene catalyst and the cocatalyst, the Al/Zr ratio in the complex, the hydrogenation temperature, and the hydrogen gas pressure, as well as the degree of hydrogenation achieved, are shown in Table 2.

TABLE 2

| Example | 6 | 7 | 8 | 9 | 10 |
|---|---|---|---|---|---|
| Amount of catalyst mmol/100 g of polymer | 1,44 | 3,08 | 1,37 | 3,09 | 1,44 |
| Amount of cocatalyst, g | 0,48 | 3,58 | 4,83 | 7,63 | 19,85 |
| Al/Zr ratio in catalyst complex | 12 | 118 | 131 | 246 | 512 |
| Temperature, °C. | 200 | 90 | 150 | 90 | 100 |
| Pressure, bar | 26 | 20 | 23 | 20 | 20 |
| Degree of hydrogenation % | 0 | 80 | 84 | 83 | 54 |

On the basis of these examples, FIG. 1 has been plotted, in which the degree of hydrogenation is shown as a function of the Al/Zr ratio in the catalyst complex.

EXAMPLES 11–14

In these examples, the effect of the amount of catalyst, i.e. the zirconocene compound, was investigated when the zirconocene compound was bis-cyclopentadienyl-Zr-dichloride. The hydrogenation reaction was performed using the procedure described in Example 1. Table 3 shows the real and proportional amounts of the zirconocene compound, the Al/Zr ratio in the complex, and the achieved degree of hydrogenation.

TABLE 3

| Example | Amount of zirconocene, mmol/100 g of polymer | Amount of catalyst complex, wt. % | Al/Zr ratio in complex | Degree of hydrogenation % |
|---|---|---|---|---|
| 11 | 0,038 | 0,22 | 114 | 31 |
| 12 | 0,068 | 0,40 | 131 | 84 |
| 13 | 0,154 | 0,90 | 118 | 80 |
| 14 | 0,352 | 2,00 | 114 | 83 |

We claim:

1. A method for the selective hydrogenation of polymers which contain aromatic and olefinic carbon-carbon double bonds which comprises selectively hydrogenating said polymers in the presence of a catalyst comprised of a metallocene compound and alumoxane, the metallocene compound in the composition being in accordance with Formula (I):

$$Ar_2ZrR_2 \qquad (I)$$

where Ar is a substituted or unsubstituted cyclopentadienyl or indenyl group and R is a halogen, a lower alkyl or benzyl group.

2. A method according to claim 1, wherein the polymer to be hydrogenated is a polymer of a vinyl aromatic hydrocarbon and a conjugated diolefinic hydrocarbon.

3. A method according to claim 2, wherein the polymer to be hydrogenated is a polymer of styrene and butadiene.

4. A method according to claim 1, 2 or 3, wherein the metallocene compound of the catalyst complex is bis-cyclopentadienyl-Zr-dichloride, bis-dimethylcyclopentadienyl-Zr-dichloride, bis-di-n-butyl-indenyl-Zr-dichloride, or bis-indenyl-Zr-dichloride.

5. A method according to claim 1, wherein the alumoxane compound in the catalyst complex is methylalumoxane.

6. A method according to claim 1, wherein the molar ratio of the zirconium metal to the aluminum metal in the catalyst complex is 50–500.

7. A method according to claim 1, wherein the amount of catalyst complex in the hydrogenation solution is 0.1–5% by weight.

8. A method according to claim 1, wherein the hydrogenation is performed at a temperature of 30°–300° C.

9. A method according to claim 1, wherein the hydrogenation is performed at a pressure of 5–50 bar.

10. The method according to claim 3, wherein said polymer is a styrene-butadiene-styrene block polymer.

11. The method according to claim 6, wherein said molar ratio is 100–300.

12. The method according to claim 7, wherein said amount of catalyst complex is 0.2–2% by weight.

13. The method according to claim 8, wherein the hydrogenation is performed at a temperature of 70°–120° C.

14. The method according to claim 8, wherein the hydrogenation is performed at a pressure of 15–25 bar.

* * * * *